United States Patent
Liu et al.

(10) Patent No.: US 12,028,609 B2
(45) Date of Patent: Jul. 2, 2024

(54) CAMERA SENSOR CHANGES IN MULTI-SENSOR DEVICE

(71) Applicant: QUALCOMM Incorporated, San Diego, CA (US)

(72) Inventors: Shizhong Liu, San Diego, CA (US);
Jianfeng Ren, San Diego, CA (US);
Weiliang Liu, San Diego, CA (US);
Nikhil Uchil, San Diego, CA (US);
Jincheng Huang, San Diego, CA (US);
Sahul Madanayakanahalli Phaniraj Venkatesh, San Diego, CA (US);
Krishnankutty Kolathappilly, San Diego, CA (US); Wei Zou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/133,221

(22) Filed: Dec. 23, 2020

(65) Prior Publication Data
US 2022/0201208 A1 Jun. 23, 2022

(51) Int. Cl.
*H04N 23/667* (2023.01)
*H04N 23/45* (2023.01)
(Continued)

(52) U.S. Cl.
CPC ........... *H04N 23/667* (2023.01); *H04N 23/45* (2023.01); *H04N 23/69* (2023.01); *H04N 23/80* (2023.01)

(58) Field of Classification Search
CPC ...... H04N 23/667; H04N 23/45; H04N 23/69; H04N 23/80; G06T 3/0093
See application file for complete search history.

(56) References Cited

U.S. PATENT DOCUMENTS 7,612,804 B1 * 11/2009 Marcu ..................... G06T 5/007
348/222.1
9,849,384 B1 * 12/2017 Energin ............. H04N 21/6587
(Continued)

FOREIGN PATENT DOCUMENTS

CN 111641775 A 9/2020
EP 3429187 A1 1/2019
(Continued)

OTHER PUBLICATIONS

International Search Report and Written Opinion—PCT/US2021/072555—ISA/EPO—dated Mar. 2, 2022 (2101137WO).

*Primary Examiner* — Hung H Lam
(74) *Attorney, Agent, or Firm* — QUALCOMM Incorporated

(57) ABSTRACT

Disruptions in the continuity of image frames output from an image capture device due to switching from one image sensor to another image sensor of the device may be reduced or eliminated through controlled timing for switching of the image sensors according to a predefined image sensor configuration. Operation of a multi-sensor image device according to the predefined image sensor configuration may include an appropriate selection of a source for image adjustment during the zoom level transition. The predefined image sensor configuration may define transition parameters for particular zoom ranges of the image capture device.

33 Claims, 6 Drawing Sheets

(51) Int. Cl.
*H04N 23/69* (2023.01)
*H04N 23/80* (2023.01)

(56) References Cited

U.S. PATENT DOCUMENTS

| | | | |
|---|---|---|---|
| 10,230,898 B2* | 3/2019 | Cohen | H04N 23/667 |
| 2005/0206720 A1* | 9/2005 | Cheatle | G11B 27/031 |
| | | | 348/E7.079 |
| 2006/0187312 A1* | 8/2006 | Labaziewicz | H04N 23/45 |
| | | | 348/E5.042 |
| 2015/0312488 A1* | 10/2015 | Kostrzewa | H04N 25/50 |
| | | | 348/164 |
| 2018/0096487 A1 | 4/2018 | Nash et al. | |
| 2018/0183982 A1 | 6/2018 | Lee et al. | |
| 2019/0122349 A1 | 4/2019 | Cohen et al. | |
| 2022/0053142 A1* | 2/2022 | Manzari | H04N 23/69 |

FOREIGN PATENT DOCUMENTS

| | | |
|---|---|---|
| EP | 3720112 A1 | 10/2020 |
| WO | WO-2021231020 | 11/2021 |

* cited by examiner

CAMERA SENSOR CHANGES IN MULTI-SENSOR DEVICE

FIELD OF THE DISCLOSURE

Aspects of the present disclosure relate generally to image processing. Some features of the disclosure may enable and provide improvements in the processing by an image signal processor of output from a multi-sensor image capture device.

BACKGROUND

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Some image capture devices include multiple image sensors that capture image data through one or more lenses, which may be referred to as a multi-sensor image capture device. The multiple image sensors may be configured with different lenses to provide multiple fields of view of a scene and/or different zoom levels of the scene. Example lens types include wide-angle lenses, ultra-wide-angle lenses, telephoto lenses, telescope lenses, periscope-style zoom lenses, fisheye lenses, macro lenses, prime lenses, or various combinations thereof. In one example, a dual camera configuration may include both a wide lens and a telephoto lens.

However, the use of multiple image sensors increases the complexity of image processing in the device because users generally are not interested in multiple images of the scene, but rather are interested in capturing and displaying a single image. The multiple frames captured from the multiple image sensors may thus be processed to generate a single image for the user. Further, due to different physical characteristics between the image sensors, frames obtained from each image sensor may, nevertheless, flow together in such a way that a transition from one image sensor to another image sensor is perceptible to the human eye, such as in a scene shift that appears in a resulting video or in a preview display. For example, zooming in or out on a device may involve switching from one image sensor to another image sensor, which causes a noticeable change in field of view at the time of the sensor switch that is perceptible to a user observing a preview image on a display or to a user watching a video recorded during the zooming in or out. Such artifacts in the output of the multi-sensor image capture device are undesirable.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described below may present other benefits than, and be used in other applications than, those described above.

BRIEF SUMMARY OF SOME EXAMPLES

Disruptions in the continuity of image frames output from an image capture device due to switching from one image sensor to another image sensor of the device may be reduced or eliminated through controlled timing for switching of the image sensors according to a predefined image sensor configuration, through appropriate selection of a source for image adjustment according to a predefined image sensor configuration, and/or a combination thereof. The predefined image sensor configuration may define transition parameters for particular zoom ranges of the image capture device. For example, the predefined image sensor configuration may define first zoom ranges and second zoom ranges for the image capture device. The first zoom ranges may specify a zoom range in which an image sensor switch to a target sensor occurs through warping the source sensor to align the image with the target sensor. The sensor switch then occurs at a later zoom level some time duration later when the target sensor can better match the field of view of the source sensor to reduce apparent shifts in the output of the multi-sensor image device. The second zoom ranges may specify a zoom range in which an image sensor is out of a desirable range, in which the image capture device immediately switches to the target sensor from the source sensor. After the immediate switch the output of the target sensor is adjusted to align with the output of the source sensor from a previous frame to reduce apparent shifts in the output of the multi-sensor image device. In these two example defined ranges, an image signal processor determines whether to adjust output from the source sensor to match the target sensor or to adjust output from the target sensor to match the source sensor. Further, the use of the predefined image sensor configuration may allow the multi-sensor image device to respond to explicit requests to change lenses by providing information for transitioning between image sensors.

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In general, this disclosure describes image processing techniques involving digital cameras having image sensors and image signal processors (ISPs). In order to achieve various zoom levels, the image signal processor may, in some instances, initiate a transition between one image sensor to another image sensor based on a zoom level command. That transition may be performed based on predetermined criteria (e.g., the defined ranges in a predefined image sensor configuration) in the image signal processor. That transition may alternatively be performed based on a request from another component in the device, such as by the CPU in response to image processing functions executing on the CPU. The different image sensors may have different lenses coupled to the different image sensors and be packaged as separate cameras, such as a first camera having a wide-angle lens coupled to a first image sensor and a second camera having a telephoto lens coupled to a second image sensor.

The image signal processor may be configured to control the capture of image frames from one or more image sensors and process the image frames from one or more image sensors to generate a view of a scene in an output frame. The configuration to control the capture may include instructions to process image sensor change requests, and in some examples process image sensor change requests during a transition of a zoom level. In response to the image sensor change request, the image signal processor may determine an appropriate time to execute the image sensor change based on a predefined image sensor configuration. When the image sensor change request is received during a zoom transition, the image signal processor may use information regarding the image sensors to determine when the image signal change can be performed at a time with reduced or no visual impact in a stream of output frames. In some embodiments, the image signal processor may have access to a predefined image sensor configuration describing defined ranges in zoom levels for the image sensors. The defined ranges in zoom levels may specify when fields of view between two or more image sensors can be matched through image adjustment to reduce appearance of the image sensor change in the output frames. In some embodiments, the ranges define characteristics of the image adjustment to be performed at various zoom levels. For example, the configuration information may describe when witching from a first sensor to a second sensor whether to adjust the output of the first sensor or to adjust the output of the second sensor to obtain the output frame. In some embodiments, the adjustment of the output image from an image sensor may include blending and/or geometric warping. Additional details regarding the image sensor change control and the image adjustment using blending or geometric warping are provided below.

In an example, the image signal processor may receive an instruction to change from a first image sensor to a second image sensor in response to software executing on the CPU determining that certain characteristics in the output image frames are detected. Example criteria include detection of certain brightness or contrast levels and/or detection of motion in the scene. When implementing the instructed camera transitions, such as during a zoom operation, an image signal processor may effectively obtain a first set of input frames from a first sensor prior to a sensor change and a second set of input frames from a second sensor following the sensor change. The image signal processor may be configured to produce a single flow of output frames, based on respective output images from the image sensors. The single flow of output frames may include image frames that contain image data from an image sensor that have been adjusted, such as by blending or geometric warping, to match the image frame to other image frames in the output flow (e.g., previous frames captured by a different image sensor). Before and/or after the sensor transition, whether frames in the output flow are based on a source image sensor or a target image sensor of a sensor change may be determined by a predefined image sensor configuration. In some embodiments, an amount of geometric warping or blending of the image frames captured by an image sensor may be determined by the predefined image sensor configuration.

After an output frame representing the scene is generated by the image signal processor, the view of the scene may be displayed on a device display, saved to a storage device as a picture or a sequence of pictures as a video, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, etc.). In other examples, the image signal processor may output frames of the image data to various output devices and/or camera modules for further processing, such as for 3A parameter synchronization, producing a video file via the output frames, configuring frames for display, configuring frames for storage, etc. That is, the image signal processor may obtain incoming frames from one or more image sensors, each coupled to one or more camera lenses, and, in turn, may produce and output a flow of output frames to various output destinations. In such examples, the image signal processor may be configured to produce a flow of output frames that may dynamically represent changing zoom levels (e.g., increasing or decreasing zoom levels). In an example, the image signal processor may receive input to change zoom levels based on pinch-to-zoom operations, gesture detections, or other user input to the device comprising the image sensors or a user device coupled to the device comprising the image sensors.

In some examples, an image signal processor may geometrically warp the last frames obtained from a first image sensor in anticipation of an image sensor change. That is, the image signal processor may warp frames obtained from a first image sensor prior to an image sensor change, such as to align pixels of the warped frame with pixel coordinates of a first anticipated input frame obtained from a second image sensor following the sensor change. In blending the last frame (e.g., a geometrically warped frame) obtained from the first (or "source") image sensor with subsequent frames obtained from the second (or "destination") image sensor, the image signal processor may blend pixels of the last frame with pixels of a subsequent frame obtained following the sensor change. By initiating the blending process in response to the image sensor change, the image signal processor may advantageously minimize the amount of memory utilized in performing the transition blending process while providing various qualitative benefits that result from pixel blending following an image sensor transition.

In one aspect of the disclosure, a method includes receiving a request to change from a first sensor to a second sensor during an image capture from a multi-sensor capture device; determining a current zoom level corresponding to the received request to change from the first sensor to the second sensor; determining whether the current zoom level is within a first defined range; and/or generating an output frame from the multi-sensor capture device by adjusting an image from one of the first sensor or the second sensor based on whether the current zoom level is determined to be within the first defined range. The method may execute according to predefined control criteria or at the request of a user. For example, the method may execute when the request to change from a first sensor to a second sensor corresponds to a change request received or scheduled to occur during a transition from a first zoom level to a second zoom level. The method further includes adjusting an image from the first sensor when the zoom level is determined to be within the first defined range, such as by geometrically warping a first image output from the first sensor to align with a field of view of the second sensor, and wherein the adjusting may be blending weight parameter, changing to the second sensor after the blending weight parameter reaches a threshold value; generating an output frame by adjusting an image from the second sensor after transitioning through the first defined range; adjusting an image from the second sensor when the zoom level is determined to be within a second defined range; and/or determining whether the current zoom level is within a first defined range by determining whether a margin on the first sensor is above a threshold amount.

A similar or same method for processing a change request may be performed when a request is received to change from the second sensor to the third sensor. In some embodiments, a single message may include instructions to change from the first sensor to the second sensor and from the second sensor to the third sensor at different times during a zoom transition. This single message may request multiple changes interpreted as different requests to change sensors. Such a method may include receiving a request to change from a second sensor to a third sensor during the image capture from the multi-sensor capture device; determining a second current zoom level corresponding to the received request to change from the second sensor to the third sensor; determining whether the second current zoom level is within a second defined range; and/or generating an output frame from the multi-sensor capture device by adjusting an image from one of the second sensor or the third sensor based on whether the second current zoom level is determined to be within the second defined range.

The method may be executed when, for example, the received request to change from the first sensor to the second sensor is based on lighting conditions during the image capture, the received request to change from the first sensor to the second sensor is based on detected movement during the image capture, and/or the received request to change from the first sensor to the second sensor based on a user input to track an object during the image capture. The received requests may be generated the imaging device, such as on one or more processors of the imaging device, and/or may be generated by an external device and communicated, such as through a wireless connection, to the imaging device performing the image capture method according to embodiments described herein.

In an additional aspect of the disclosure, an apparatus is disclosed that includes at least one processor, and a memory coupled to the at least one processor. The at least one processor is configured to perform any of the methods or techniques described herein. For example, the at least one processor may be configured to perform steps including receiving a request to change from a first sensor to a second sensor during an image capture from a multi-sensor capture device; determining a current zoom level corresponding to the received request to change from the first sensor to the second sensor; determining whether the current zoom level is within a first defined range; and/or generating an output frame from the multi-sensor capture device by adjusting an image from one of the first sensor or the second sensor based on whether the current zoom level is determined to be within the first defined range. The at least one processor may include an image signal processor or a processor including specific functionality for camera controls and/or processing. The at least one processor may also or alternatively include an applications processor. The methods and techniques described herein may be entirely performed by the image signal processor or the applications processor, or various operations may be split between the image signal processor and the application processor, and in some embodiments additional processor.

The apparatus may include at least two image sensors, including a first image sensor and a second image sensor, wherein the first image sensor has a larger field of view (FOV) than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The device may switch to outputting frames based on outputs of other image sensors and/or use image frames from multiple image sensors to generate an output frame, which may be adjusted based on methods and techniques described herein.

In an additional aspect of the disclosure, a device configured for image capture is disclosed. The apparatus includes means for receiving a request to change from a first sensor to a second sensor during an image capture from a multi-sensor capture device; means for determining a current zoom level corresponding to the received request to change from the first sensor to the second sensor; means for determining whether the current zoom level is within a first defined range; and/or means for generating an output frame from the multi-sensor capture device by adjusting an image from one of the first sensor or the second sensor based on whether the current zoom level is determined to be within the first defined range. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses).

In an additional aspect of the disclosure, a non-transitory computer-readable medium stores instructions that, when executed by a processor, cause the processor to perform operations including those described in the method and techniques described herein. For example, the operations may include receiving a request to change from a first sensor to a second sensor during an image capture from a multi-sensor capture device; determining a current zoom level corresponding to the received request to change from the first sensor to the second sensor; determining whether the current zoom level is within a first defined range; and/or generating an output frame from the multi-sensor capture device by adjusting an image from one of the first sensor or the second sensor based on whether the current zoom level is determined to be within the first defined range.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of an information handling system including a first network adaptor configured to transmit data over a first network connection of a plurality of network connections; and a processor coupled to the first network adaptor, and the memory. In some embodiments, the network connection may couple the information handling system to an external component, such as a wired or wireless docking station.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
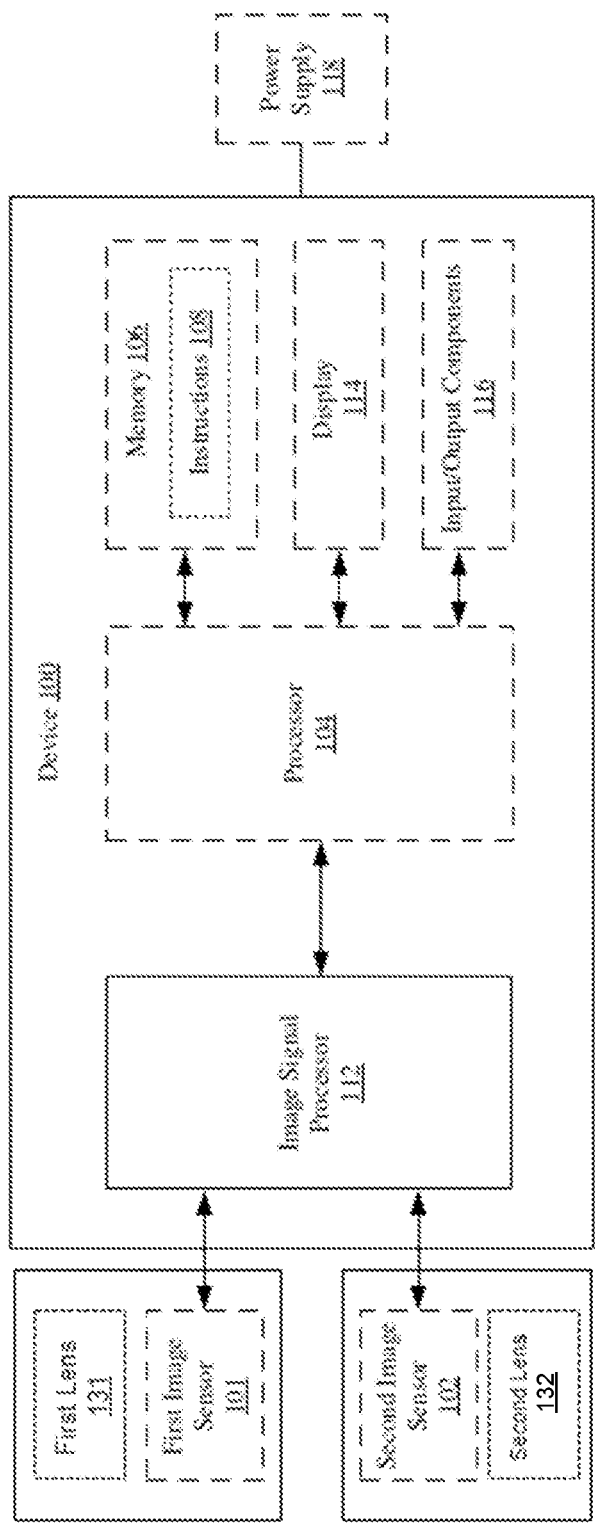
FIG. 1 is a block diagram of a computing device configured to perform one or more of the example techniques described in this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support a flexible zoom transition in multi-sensor image capture devices. The flexible zoom transition allows a change in image sensor upon request from a user or application executing on a computing device. Particular implementations of the subject matter described in this disclosure may be implemented to realize potential advantages or benefits, such as improved image quality by changing to an image sensor with better image quality for the current scene conditions and/or applied image capture settings, and/or improved user experience by reducing apparent shifts in the display when changing image sensors.

Aspects of the present disclosure may be used for capturing image frames using multiple image sensors of an image capture device. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees. Some aspects of the disclosure include processing the captured image frames, such as by adjusting spatial alignment of one or more of the captured image frames while the device transitions from capturing images of a scene using a first of the multiple image sensors to capturing images of the scene using a second of the multiple image sensors. The adjustments may be performed on image frames selected from one of the multiple image sensors based, at least in part, on a predefined image sensor configuration and a current zoom level in a zoom level transition.

An example device for capturing image frames using multiple image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors, Computer Vision Processors (CVPs), or other suitable circuitry for processing images captured by the image sensors. The one or more image signal processors may provide the processed image frames to a memory and/or a processor (such as an application processor, an image front end (IFE), an image processing engine (IPE), or other suitable processing circuitry) for further processing, such as for encoding or other manipulation.

As used herein, image sensor may refer to the image sensor itself and any other suitable components coupled to the image sensor. For example, an image sensor may also refer to other components of a camera, including a shutter, buffer, or other readout circuitry. The image sensor may further refer to an analog front end or other circuitry for converting analog signals to digital representations for the frame. Therefore, the term "image sensor" herein may refer to any suitable components for capture and readout of an image frame to an image signal processor.

An example multi-sensor device may capture "wide" images of a scene using a wide sensor when a current zoom ratio of the device is a first value, and the device may change to capturing "tele" images of the scene using a tele sensor when the current zoom ratio is a second, higher value. The device may capture an image of the scene using both sensors concurrently or approximately concurrently when the current zoom ratio is within a defined range of values, which may be referred to herein as an "overlap zone." The device may use image data from the one or more sensors to generate, for example, preview images of the scene for display to a user of the device. However, each of the image sensors, in addition to possibly having a different FOV due to magnification also has a different FOV due to being at a different location on the device. That is, each image sensor is displaced from other image sensors in an x-y plane corresponding to the plane of the device, which results in image frames captured from each image sensor being shifted. Further, due to manufacturing imperfections, the multiple sensors and/or the captured images may be spatially misaligned, which may result in misalignment errors related to the generated images when the current zoom ratio of the device. The shift of optical axes from one image sensor to other image sensors and/or the misalignment errors may cause visual imperfections in the corresponding preview images or captured videos. Aspects of the present disclosure provide a multi-sensor device that can change from capturing images of a scene using a first one of the sensors to capturing images of the scene using a second one of the sensors by adjusting captured images from either the first or second sensors as specified in a predefined image sensor configuration.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

In the figures, a single block may be described as performing a function or functions; however, in actual practice, the function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on).

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from multiple image sensors. The device 100 may include, or otherwise be coupled to, an image signal processor 112 for processing image frames from multiple image sensors, such as a first image sensor 101 and a second image sensor 102. In some implementations, the device 100 also includes or is coupled to a processor 104 and a memory 106 storing instructions 108. The device 100 may also include or be coupled to a display 114 and a number of input/output (I/O) components 116. The device 100 may further include or be coupled to a power supply 118 for the device 100, such as a battery or a component to couple the device 100 to an energy source. The device 100 may also include or be coupled to additional features or components not shown. In one example, a wireless interface, which may include a number of transceivers and a baseband processor, may be included for a wireless communication device. In another example, one or more other sensors (such as a gyroscope or a global positioning system (GPS) receiver) may be included in or coupled to the device. In a further example, an analog front end to convert analog image frame data to digital image frame data may be coupled between the image sensors 101 and 102 and the image signal processor 112.

The image signal processor 112 may receive image data from a local bus connection to image sensors or by other connections, such as a wire interface to an external image sensor or wireless interface to a distant image sensor. In some embodiments, the device 100 may include a first camera comprising the first image sensor 101 and corresponding first lens 131 and a second camera comprising the second image sensor 102 and corresponding second lens 132. In some embodiments, the device 100 may include an interface to receive image data from the image sensors 101 and 102 located apart from the device 100. The device 100 may perform image processing on the image data from a combination of image sensors located within the device 100 or separate from the device 100.

The first image sensor 101 and the second image sensor 102 are configured to capture one or more image frames. For example, the first image sensor 101 and the second image sensor 102 may be included in one multiple camera configuration or in separate single cameras or separate multiple camera configurations (such as a dual camera configuration, a triple camera configuration, and so on, for a smartphone or other suitable device). The image sensors 101 and 102 may also include or be coupled to one or more lenses for focusing light, one or more apertures for receiving light, one or more shutters for blocking light when outside an exposure window, one or more color filter arrays (CFAs) for filtering light outside of specific frequency ranges, one or more analog front ends for converting analog measurements to digital information, or other suitable components for imaging. For example, the first image sensor 101 may be coupled to a first lens 131 and the second image sensor 102 may be coupled to a second lens 132. The first lens 131 and second lens 132 may have different field of views, such as when the first lens 131 is an ultra-wide (UW) lens and the second lens 132 is a wide (W) lens. The device 100 may also include or be coupled to a flash, a depth sensor, a GPS, or other suitable components for imaging.

The image signal processor 112 processes image frames captured by the image sensors 101 and 102. While FIG. 1 illustrates the device 100 as including two image sensors 101 and 102 coupled to the image signal processor 112, any number of image sensors may be coupled to the image signal processor 112. In addition, any number of additional image sensors or image signal processors may exist for the device 100. In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may execute software and/or may include specific hardware (such as one or more integrated circuits (ICs)) to perform one or more operations described in the present disclosure.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to the memory and configured to access the memory for writing output frames for display or long-term storage.

In some embodiments, the processor 104 may include one or more general purpose processors capable of executing scripts or instructions of one or more software programs, such as instructions 108 stored within the memory 106. For example, the processor 104 may include one or more application processors configured to execute the camera application (or other suitable application for generating images or video) stored in the memory 106. In executing the camera application, the processor 104 may be configured to instruct the image signal processor 112 to perform one or more operations with reference to the image sensors 101 or 102. For example, the camera application executing on processor 104 may receive a zoom level change request from a user and instruct the image signal processor 112 to transition to a new zoom level. During the transition to the new zoom level, the processor 104 may detect changes in the scene that meet certain criteria for changing image sensors during the zoom level change, and the processor 104 may issue a sensor change request to the image signal processor 112. Execution of instructions 108 outside of the camera application by the processor 104 may also cause the device 100 to perform any number of functions or operations. In some embodiments, the processor 104 may include ICs or other hardware in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, at least one of the image signal processor 112 or the processor 104 can execute instructions to perform various operations described herein. For example, execution of the instructions can instruct the image signal processor 112 to change from capturing a first image of a scene captured using the first image sensor 101 at a first zoom ratio to a second image of the scene captured using the second image sensor 102 at a second zoom ratio. In some embodiments, the first image may have a different FOV than the second image as a result of the first image sensor 101 having a different FOV than the second image sensor 102 or the first lens 131 having a different FOV than the second lens 132.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, the processor 104, the memory 106, the image signal processor 112, the display 114, and the I/O components 116 may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
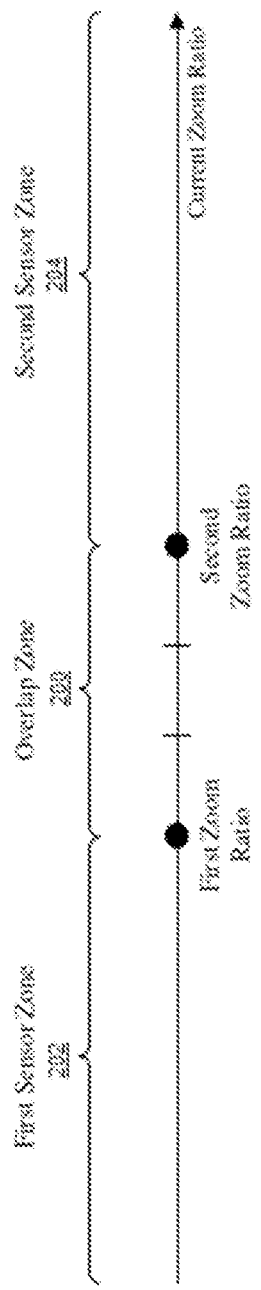
FIG. 2 is an illustration of operation of multiple image sensors in example techniques described in this disclosure.

As described above, the different first and second lenses 131 and 132 may result in image frames captured from the first and second image sensors 101 and 102 having different characteristics, such as different fields of view, but the image sensors may also produce similar image frames in overlap zones. FIG. 2 illustrates an example overlap zone 200 spanning between a first zoom ratio and a second zoom ratio of a device as a current zoom ratio of the device increases. The device may be an example embodiment of the device 100 shown in FIG. 1. While the overlap zone 200 is described with reference to the devices, components, and operations shown in the previous Figure, any suitable device or device components may perform the operations described with respect to FIG. 2. In some embodiments, the first sensor is an example embodiment of the first image sensor 101 of FIG. 1 and may be a wide-angle image sensor (or "wide sensor"), and the second image sensor is an example embodiment of the second sensor 102 of FIG. 1 and may be a tele image sensor (or "tele sensor").

When the current zoom ratio of the device 200 is within the first sensor zone 202, the device 100 may capture wide images using only the wide sensor. In some embodiments, the first sensor zone 202 may begin at the far-left side of FIG. 2 (e.g., a zoom ratio of 1.0×) and end at the "first zoom ratio" (e.g., a 2.7× zoom ratio). In contrast, when the current zoom ratio of the device 100 is within the second sensor zone 204, the device 100 may capture tele images using only the tele sensor. In some implementations, the second sensor zone 204 may begin at the second zoom ratio (e.g., a zoom ratio of 3.0×) and end at the far-right side of FIG. 2 (e.g., a zoom ratio of 10.0×).

In an overlap zone, a range of zoom levels may be captured from either the wide or tele images. When the current zoom ratio of the device 100 is within the overlap zone (e.g., a zoom ratio between 2.7×-3.0×), the device 100 may capture wide images using the wide sensor concurrently with capturing tele images using the tele sensor. An output frame from the image signal processor processing the wide images and tele images may be based on either the wide image or the tele image by adjusting the wide image or the tele image to align with the other of the wide image or the tele image. Such adjustment may allow a smooth change, relative to a change without adjustment, from the wide sensor to the tele sensor when, for example, a zoom level change is occurring from a zoom level within the first sensor zone 202 to a zoom level within the second sensor zone 204. Without such an adjustment the shift in optical axes from the wide sensor to the tele sensor may be noticeable to the user creating a noticeable discontinuity appearing as a jump from a first location to a second location of an object in the output frame. The image signal processor may determine which of the wide image or the tele image to adjust based on a predefined image sensor configuration, which may include a number of defined zoom ranges. An example predefined image sensor configuration is shown in FIG. 3.

Figure 3:
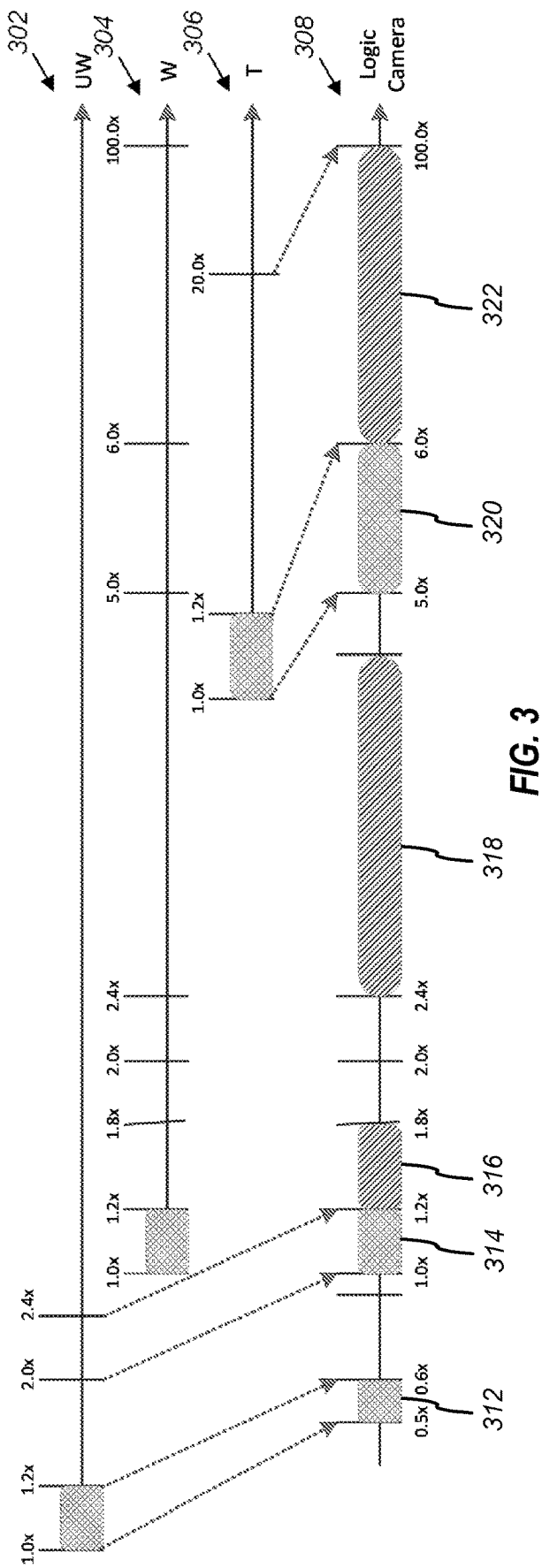
FIG. 3 is an illustration of defined zoom level ranges for a flexible zoom transitions in example techniques described in this disclosure.

FIG. 3 is a graph illustrating a predefined image sensor configuration defining several ranges of possible overlap between image sensors according to some embodiments of the disclosure. A first graph 302 demonstrates zoom levels available for a first image sensor corresponding to an ultrawide (UW) image sensor in this embodiment. A second graph 304 demonstrates zoom levels available for a second image sensor corresponding to a wide (W) image sensor in this embodiment. A third graph 306 demonstrates zoom levels available for a third image sensor corresponding to a tele (T) image sensor in this embodiment. The scales for each of the UW, W, and T image sensors shown are scaled such that a zoom level for each image sensor has a same field of view for the other image sensors at corresponding points on the axis. A starting zoom range from approximately 1.0× to 1.2× in this embodiment for each of the sensors on graphs 302, 304, and 306 are shaded to show that at these zoom levels on those lenses there is little to no margin at the edges of the corresponding image frames for cropping. In these initial zoom ranges, image frames may be captured, but there is limited data in the image frames for performing scaling of the image frames, such as to match a desired field of view.

Each of the identified zoom ranges for the separate cameras may be combined to form a fourth graph 308 defining desired zoom ranges for the multi-sensor image device. The fourth graph 308 illustrates several defined ranges within logical zooms available for capturing images using the available UW, W, and T image sensors represented by graphs 302, 304, and 306. The logical zooms of graph 308 may correspond to zoom levels presented to a user during operation of a camera application. When the user specifies a zoom level in a camera application, an image sensor may be identified for capturing images at that specific logical zoom level and that image sensor controlled to adjust its actual zoom level to reach the desired logical zoom level. For example, when a user requests a logical zoom of 5.0×, an image signal processor may control either the tele image sensor to obtain an image frame at a zoom of 1.3× or the wide image sensor to obtain an image frame at a zoom of 5.0×.

The graph 308 illustrates a predefined image sensor configuration with defined ranges 312, 314, 316, 318, 320, and 322. These defined ranges may be used to determine which image sensor output is adjusted to generate an output frame and/or when to change from one of the UW, W, and T image sensors to another of the UW, W, and T image sensors. The defined ranges may include a first set of defined ranges 312, 314, and 320, which may be referred to as a "green zone" and indicated by cross-hatching. Ranges in the first set of defined ranges specify zoom levels for which an image from a second sensor has an overlapping field of view with the first sensor but insufficient margin in the second sensor to process to match the first sensor. A determination of whether sufficient or insufficient margin exists may involve comparing a margin available for an image sensor with a threshold value. The threshold value may be based on, or equal to, the margin that a sensor can provide due to the field of view is smaller than the frame size. For example, the determination may be made by comparing the field of view of the image sensor at a particular zoom level with a predefined offset value indicating an amount of shift used to align the image sensor output to another image sensor. If the field of view for the image sensor is larger than the desired frame size at the particular zoom level by at least the offset value, then the determination may be that there is sufficient margin to match the image sensor output to another image sensor.

When a zoom level change is requested of the device, the device adjusts from a first zoom level to a second zoom level on the graph 308. An image sensor change request may be received while transitioning from the first zoom level to the second zoom level. The image sensor change request may indicate a source image sensor and a target image sensor. When the transition in logical zoom level passes through one of the first set of defined ranges 314 or 320 and an image sensor change request is received, an output of the source image sensor may be adjusted to align with an output of the target image sensor to produce an output frame. The use of the source image sensor as the basis for the output frame may continue until the current zoom level reaches the end of one of the first set of defined ranges 314 or 320.

In some embodiments, the image sensor change may occur prior to reaching the end of one of the defined ranges 314 or 320, such as when a parameter reaches or exceeds a threshold value. For example, the image signal change may occur when an alpha parameter used in adjusting an output of the image sensor reaches or exceeds a threshold value, which may occur prior to reaching the end of the defined range 314. In some embodiments, the adjustment may be a blending of the output image from the determined source or target sensor with a previous frame. For example, the image signal processor may blend one or more pixels of a previous frame output from the source sensor with one or more pixels of an output image from the determined source or target sensor by applying a blending function that determines pixel contribution levels as follows:

$$Y_1' = \alpha(X_M) + (1-\alpha)Y_1,$$

wherein:
$Y_1'$ represents the output frame as adjusted by the blending weight $\alpha$,
$X_M$ represents the previous frame,
$Y_1$ represents the output of the determined source or target sensor, and
$\alpha$ represents a blending weight the follows: $0 \leq \alpha \leq 1$.

In different embodiments, the image signal processor may determine, automatically, or based on manual input, or both, a value to assign to the blending weight (e.g., between 0 and 1, 0 and 100%, etc.). Regardless of the manner of determining the blending weight parameter, a threshold may be set for completing the requested sensor change, such as when alpha reaches 0.8 or 80%. In some embodiments, the zoom transition may occur faster than the parameter reaches a threshold value, that one of the second defined set of ranges occurs first, in which case the image sensor changes regardless of the parameter not reaching the threshold value.

In some embodiments, the image signal processor may geometrically warp the previous frame ($X_M$) captured from the first sensor prior to changing sensors while in one of the first defined range 312, 314, or 320. In some embodiments, the previous frame ($X_M$) may be geometrically warped, such as through the warping described with reference to FIG. 6 below. In some embodiments, the image signal processor may forego blending one or more pixels of the previous frame, such as one or more edge pixels (e.g., corner pixels), while blending one or more other pixels of the previous frame with one or more corresponding pixels of an output image of the determined source or target image sensor. In such embodiments, the blended frame, generated via pixels of the previous frame and pixels of the output image, may include a contribution from the previous frame and a reciprocal contribution from the output image relative to a reduced portion of the output frame based on the blending weights or another equivalent method of foregoing blending of pixels in particular regions of the frames during the sensor change process.

In one example involving the defined range 314, a zoom level change is requested from 0.8× to 1.4× and an image sensor change request from UW to W is received when the zoom level is at 1.1×. The image signal processor may determine that the image sensor change request is received within the defined range 314, which is one of the first set of defined ranges. Based on the defined range 314, the image signal processor may determine to adjust the output of the UW image sensor to align with the W image sensor while the zoom level transition continues through 1.2×, which is the end of the defined range 314. At zoom level 1.2×, the image signal processor may change to the W image sensor and complete the zoom level change by transitioning to the requested 1.4× zoom level by controlling parameters of the W image sensor. The delay in changing of the image sensor from the UW to the W image sensor allows the zoom level to reach a level at which there is sufficient margin in the W image sensor to match the UW image sensor output and reduce artifacts in the sequence of frames obtained during the transition from 0.8× to 1.4× zoom levels.

The defined ranges may include a second set of defined ranges 316, 318, and 322, which may be referred to as a "red zone" and indicated by shading. In these zoom level ranges, if a sensor change request is received the sensor change is performed immediately or as soon as possible and the output image of the target image sensor is adjusted to match the previous output frame of the source image sensor. The adjusting continues after the change to the target image sensor to arrive at a desired zoom level. The image sensor change may be performed at any zoom level within the defined ranges 316, 318, and 322 because there may be sufficient margin on the target image sensor to perform the adjustment to align the output image of the target image sensor with the output image of the source image sensor.

In one example involving the defined range 316, a zoom level change is requested from 0.8× to 1.4× and an image sensor change request from UW to W is received when the zoom level is at 1.3×. The image signal processor may determine that the image sensor change request is received within the defined range 316, which is one of the second set of defined ranges. Based on the defined range 316, the image signal processor may determine to adjust the output of the W image sensor to align with the UW image sensor and immediately change the output frame to the adjusted output image from the W image sensor. The image signal processor may complete the zoom level change by transitioning to the requested 1.4× zoom level by controlling parameters of the W image sensor.

A predefined image sensor configuration such as illustrated in FIG. 3 may be used to define zoom level ranges and a behavior for handling image sensor changes within the zoom level ranges. In some embodiments, the defined ranges may correspond with physical characteristics of the image sensors, such as the image sensor size and/or zoom range of an associated lens. The configuration may be stored in a configuration file or other memory coupled to the image signal processor and accessed to determine image sensor change behavior based on zoom level. For example, the predefined image sensor configuration may be used to determine whether to adjust an output image of a first sensor or a second sensor for generating an output frame during a zoom level transition as described in the example method of FIG. 4.

Figure 4:
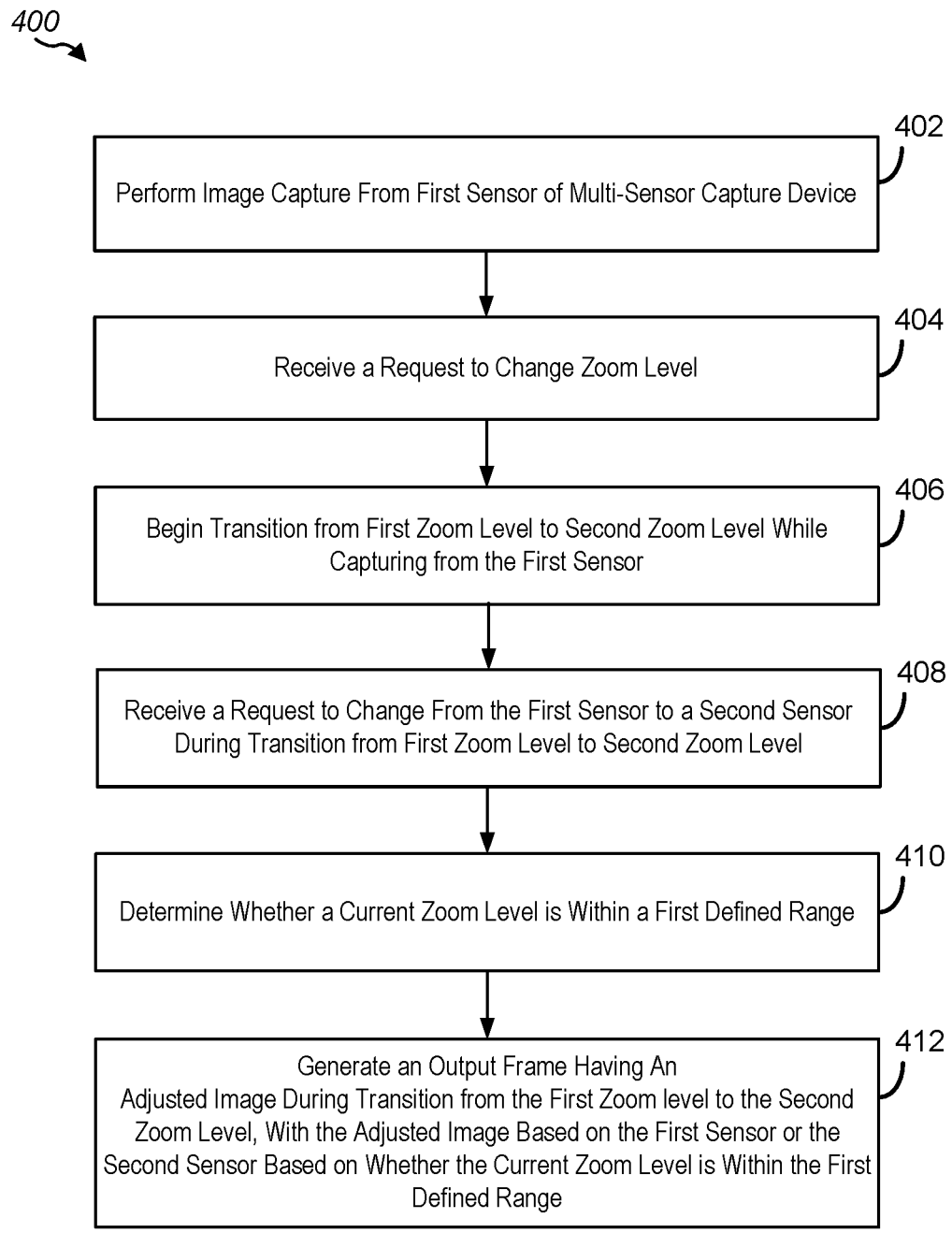
FIG. 4 is a flow chart illustrating operation of multiple image sensors in response to a sensor change request in example techniques described in this disclosure.

FIG. 4 is a flow chart illustrating an example method for controlling an image capture device according to some embodiments of the disclosure. A method 400 begins at block 402 with performing an image capture from a first sensor of a multi-sensor capture device. Block 402 may involve the execution of a camera application to generate preview images for obtaining a picture and/or to generate a sequence of frames for a video file. In other examples, the image capture of block 402 may involve the execution of a video conferencing application, a chat application, a mixed reality application, an augmented reality application, or another application that involves image processing. The application may be executing on an application processor that is coupled directly to the multi-sensor capture device or indirectly to the multi-sensor capture device through an image signal processor.

At block 404, a request to change zoom level may be received. The zoom level change may be requested by a user of an application executing on the application processor. The zoom level change may alternatively be generated automatically by the application executing on the application processor, such as when involved in the tracking of an object in a scene. In another example, the zoom level change may be generated by the image signal processor automatically in response to changing conditions in the scene. In some embodiments, the zoom level change request may specify a destination zoom level for which the multi-sensor capture device. In other embodiments, the zoom level change request may specify other parameters that correspond to a destination zoom level, such as by specifying a defined image size or region of a scene that the multi-sensor capture device is controlled to capture.

At block 406, the multi-sensor capture device begins the transition from a first zoom level to a second zoom level while capturing from a first sensor of the multi-sensor capture device. The first zoom level may correspond to a current zoom level at the time the request of block 404 is received. The second zoom level may be a requested zoom level, such as generated when a user requests a zoom-in or zoom-out operation through a camera application. For example, the second zoom level may be a zoom level representing a region of a scene specified by a pinch-to-zoom operation on a touch screen. The transition of block 406 may include, for example, operating a position of a lens coupled to the first sensor and/or adjusting a cropping and/or scaling operation applied to a captured image frame from the first sensor.

At block 408, a request to change from the first sensor to a second sensor is received during a transition to the second zoom level begun at block 406. The request may be generated by the camera application or other application code, such as in a camera framework, executing on the application processor of the computing device. The sensor switch request may be generated based on one or several criteria. In one example, the brightness of a scene, an object, or face may be determined to match or exceed a threshold level to trigger a sensor change request. For example, the target sensor may have a lens with a larger aperture than a lens of the source sensor, such that changing from the source sensor to the target sensor would be advantageous for improving image quality. In another example, motion of an object or person in the scene may be determined to match or exceed a threshold level to trigger a sensor change request.

At block 410, in response to the sensor change request of block 408, the computing device may determine whether a current zoom level is within a first defined range for the second sensor. For example, referring to the example configuration of FIG. 3, the current zoom level at the time that the sensor change request is received may be compared to the ranges 312, 314, and 320. Referring also to FIG. 3, the current zoom level at the time that the sensor change request is received may be compared to the ranges 316, 318, and 322. The determination of whether the current zoom level is within one of the ranges 312, 314, 316, 318, 320, or 322 may be used to determine when a sensor change is performed in response to the sensor change request.

At block 412, an output frame is generated by adjusting an image output from the first sensor and/or the second sensor, in which the first and/or second sensor is determined based, at least in part, on the identification of defined ranges performed in block 410. For example, when the current zoom level is within a first defined range then the output image may be generated by adjusting an image from the first sensor until a later time when the sensor change occurs. The sensor change may occur as soon as possible after receiving the sensor change request that sufficient margin is available from the second sensor to be adjusted into alignment with the first sensor. In another example, when the current zoom level is within a second defined range then the output image may be generated by immediately changing to the second sensor and adjusting output from the second sensor to align with an output of the first sensor that was the basis for the immediately preceding output frame. The adjustment of an output image from the first sensor or the second sensor may align the field of view between two sensors with different field of views to reduce choppiness in changing from the first sensor to the second sensor. The sensor change may occur immediately when the current zoom level is in no defined range. No adjustment may be performed to the output of the second sensor because adjustment of images to match fields of view may not be possible outside of the defined ranges.

The operation of blocks 410 and 412 in determining the current zoom level and a generating an adjusted image based on the current zoom level may be repeated until the zoom level transition is completed. For example, as the current zoom level proceeds in the transition from the first zoom level to the second level zoom, the current zoom level may be determined whether to be in or not in the first defined range at block 412. Action to change the manner of generating an adjusted image, such as by changing from basing the adjusting image on the first image sensor or the second image sensor, may be taken when the current zoom level reaches a defined criteria for the first defined range as described in examples that follow.

Figure 5:
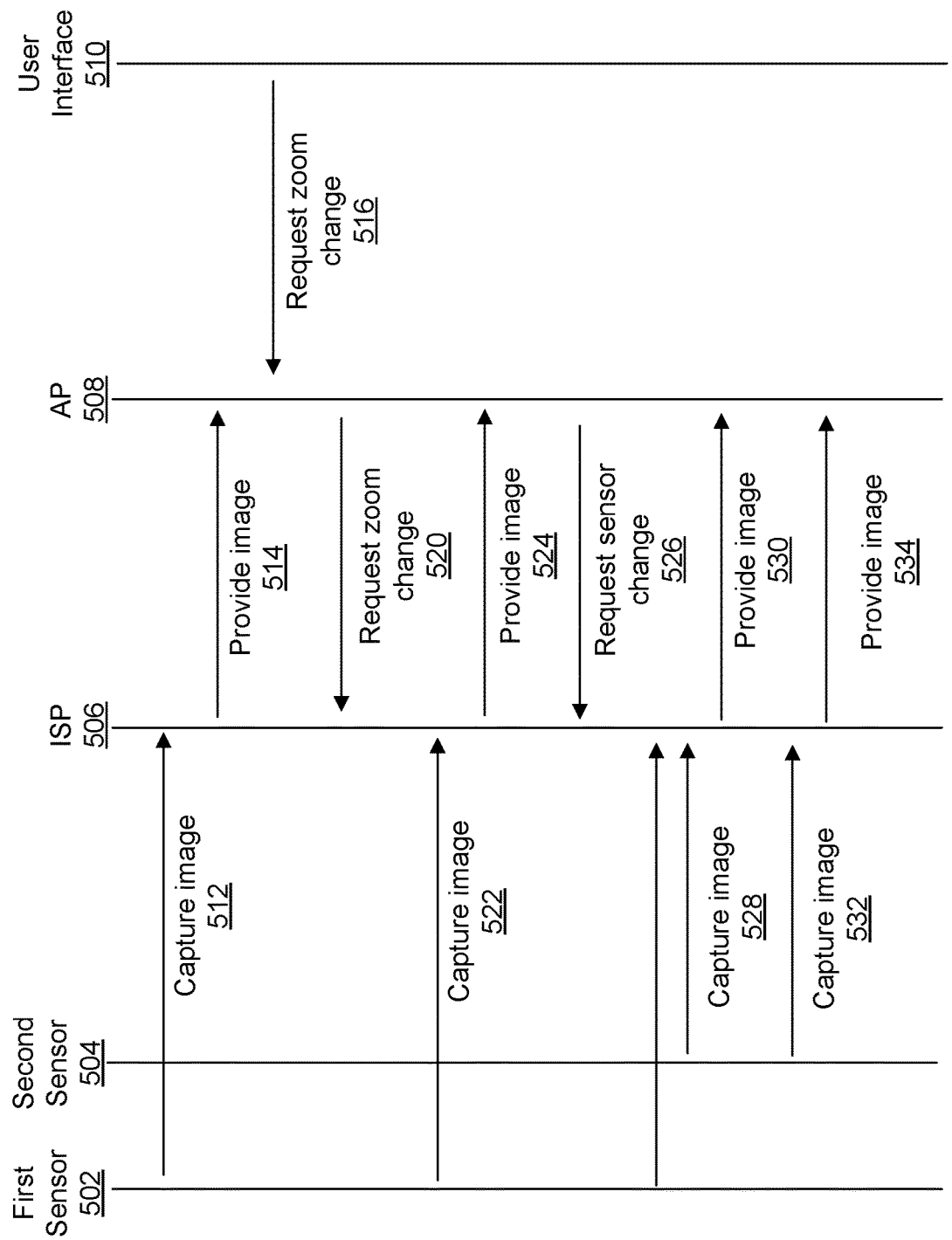
FIG. 5 is a call flow diagram illustrating operation of multiple image sensors with a sensor change request in example techniques described in this disclosure.

An example operation of operating a multi-sensor image device within a computing device using a predefined image sensor configuration is shown in FIG. 5. FIG. 5 is a call diagram illustrating the capture of images in an image capture device according to some embodiments of the disclosure. A first sensor 502 and a second sensor 504 may be coupled to an image signal processor (ISP) 506, such as separately through a camera serial interface bus or through a shared bus. The ISP 506 may be coupled to an application processor (AP) 508, such as through a peripheral component interface bus. The AP 508 may execute software to provide a user interface 510 as part of, for example, a camera application for receiving commands from the user, such as a zoom level change, and/or display an output frame or sequence of frames to the user, such in generated a preview image for the camera application.

An image capture may be in progress at call 512, such as for generating a preview image at the user interface 510. At call 512, the first sensor 502 provides a captured image to the ISP 506. The ISP 506 processes the image and provides the image at call 514 to the AP 508. During operation of the camera application, the AP 508 may receive a zoom level change request at call 516. The request at call 516 may be in response to a pinch-to-zoom gesture from a user at the user interface 510 or generated automatically. The AP 508 may transmit the zoom level change request to the ISP 506 at call 520. The ISP 506 may begin the transition from the current zoom level to the requested zoom level in response to receiving call 520. During the transition, the ISP 506 may continue to capture images, such as at call 522, and provide images to the AP 508, such as at call 524. The continued capture of images may allow, for example, the presentation of a preview image to the user through the camera application or the continued recording of video by the camera application during the zoom change.

During the transition to the requested zoom level of call 520, the AP 508 may transmit a sensor change request at call 526 to the ISP 506. In response to call 526, the ISP 506 may determine a method for changing lenses during the transition to the requested zoom level of call 520. For example, the ISP 506 may determine whether the current zoom level as of receipt of call 526 is within a predefined range and perform operations based on whether the current zoom level is within a predefined range, such as described in blocks 408, 410, and 412 of FIG. 4. At call 528, the ISP 506 receives output images from the first sensor 502 and/or the second sensor 504. The ISP 506 may process one or both of the output images from the first sensor 502 and the second sensor 504 to generate an output frame to be provided at call 530 to the AP 508. In some embodiments, determination of which of sensors 502 and 504 is captured and adjusted to form the output frame to the AP 508 is determined based on whether the current zoom level matches a defined range. As the zoom level change continues in response to call 520, the ISP 506 may continue to process images from one or both of the sensors 502 and 504 until the requested zoom level is achieved and the requested sensor change of call 526 is completed.

After completing the sensor change in response to call 526, the ISP 506 may capture images from the second sensor 504 at call 532. The ISP 506 provides those images or processed versions of those images to the AP 508 at call 534. The zoom level change of call 520 may be completed after changing sensors at call 532 if the current zoom level after the sensor change is not the requested zoom level.

The processing of sensor change requests, such as by the ISP in response to requests from the AP, allow flexible zoom transitioning between lenses at any zoom level rather than at predefined fixed points. The resulting output frames have reduced artifacts (including reduced choppiness or reduced disruption) between output frames of a multi-sensor capture device during a zoom level transition. The flexible zoom transitioning may be performed based on a predefined image sensor configuration and/or characteristics of the sensors in the multi-capture device. In some embodiments, the flexible zoom transitioning may provide a spatial alignment generic framework to allow changing between two, or three, or four, or more image sensors with different field of views. One embodiment of such a multi-sensor capture device includes a camera module with a first image sensor coupled with a first lens to provide an ultrawide view, a second image sensor coupled with a second lens to provide a wide view, and a third image sensor coupled with a third lens to provide a telephoto view. An additional lens, such as an infrared image sensor, may be part of the multi-sensor capture device and used to capture depth information corresponding to the scene.

Providing a single viewing experience for the user despite multiple image sensors improves the user experience with using the multi-sensor capture device. By reducing the user's exposure to the separate images output from the multiple sensors, the user may obtain the benefit of an improved capture experience based on multiple sensor outputs with different benefits without increased user complexity. Further, the framework for processing sensor change requests may result in improved image quality by allowing a better lens to be used for capturing images from the multi-sensor capture device based on scene conditions. A change to the better lens during the zoom lens transition may provide better images to the user in response to changing scene conditions, rather than waiting to change image sensors at fixed zoom levels.

Figure 6:
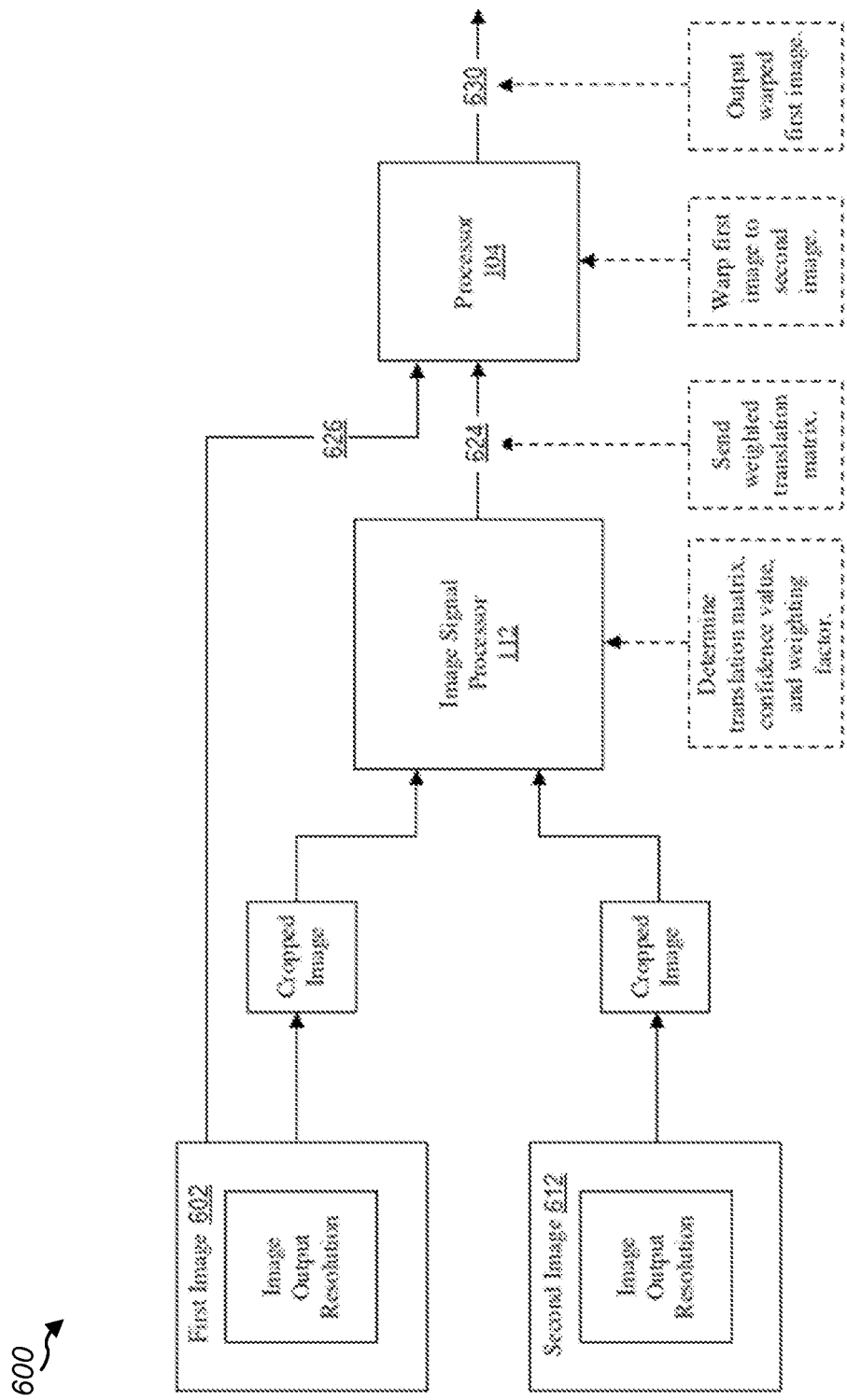
FIG. 6 is a block diagram illustrating adjusting an image with a geometric warp in example techniques described in this disclosure.

The adjustment of an output of an image sensor, such as described above and in block 412 of FIG. 4, to align a field of view of one image sensor to an output of another image sensor may be performed by a geometric warp operation. One example of a geometric warping of one image to another image is described with reference to FIG. 6. FIG. 6 shows an example data flow 600 for a device performing spatial alignment transform of one or more image frames. The device may be an example implementation of the device 100 shown in FIG. 1. While data flow 600 is described with reference to the devices, components, and operations shown in the previous Figures, any suitable device or device components may perform the operations described in relation to data flow 600.

A first image 602 and a second image 612 are captured by a first and a second image sensor of the device 100, respectively, which is not shown for simplicity. In some embodiments, the first and second image sensors may be example implementations of the first image sensor 101 and the second image sensor 102 of FIG. 1, respectively. As a non-limiting example, the first image 602 may be a wide-angle image captured at a first zoom ratio (e.g., 4.9×), and the second image 612 may be a tele image captured at a second zoom ratio (e.g., 5.0×). In some implementations, the first image 602 and the second image 612 may be captured at an initial resolution (e.g., 2304×1728) higher than a final output resolution (e.g., 1920×1440) of the images. As shown in FIG. 6, the device 100 may crop the images to a smaller resolution (e.g., 480×360) for further processing at the image signal processor 112.

In some embodiments, the image signal processor 112 scales the first image 602 to match the field of view (FOV) of the second image 612 and identifies one or more spatial misalignments between the scaled first image 602 and the second image 612. As shown in FIG. 6, the image signal processor 112 determines a translation matrix based on the one or more spatial misalignments, determines a confidence associated with the translation matrix, compares the confidence with a confidence threshold, determines a weighting factor in response to the confidence being greater than the confidence threshold, and applies the weighting factor to the translation matrix. In response to the confidence being greater than the confidence threshold, the image signal processor 112 may determine a weighting factor based on the first zoom ratio, the second zoom ratio, and a current zoom ratio of the device 100. In some embodiments, the weighting factor may be 0% when the current zoom level is equal to a first zoom ratio corresponding to the current zoom level when the sensor change request is received and the weighting factor may be 100% when the current zoom ratio is equal to the requested zoom level from the zoom level change request or the zoom level corresponding to an end of a define range. In some embodiments, the image signal processor 112 may refrain from determining an additional translation matrix when the confidence is greater than the confidence threshold. In some other embodiments, when the confidence is not greater than the confidence threshold, the weighting factor may be an identity matrix. Thereafter, the image signal processor 112 may send the weighted translation matrix to the processor 104 in process 624.

The processor 104 may receive the first image at process 626 at the initial resolution and warp the first image to the second image using the weighted translation matrix from the image signal processor 112. In some embodiments, the final output resolution of the warped first image (e.g., 1920× 1440) may be less than the initial resolution (e.g., 2304× 1728) of the first image 602. In this manner, the first image 602 may have a pixel margin between the final output resolution and the initial resolution. Thus, when the processor 104 warps (e.g., shifts and/or rotates) the first image 602 to the second image, only pixels within the pixel margin may be shifted or rotated out of frame, so the processor 104 may output, at process 630, the warped image to a display of the device 100 without any loss of FOV or quality because only pixels within the pixel margin may be shifted or rotated out of frame. In some embodiments, the device 100 may then generate a preview image based on the warped first image and the second image 612. In some embodiments, the ISP 112 may perform the warping of the first image to the second image and send the output frame resulting from the warp to the processor 104 for output to a display in process 630.

The geometric warp of data flow 600 may be adjusted based on defined zoom level ranges, such as illustrated in FIG. 3. For example, in the first set of defined ranges of FIG. 3, the first image 602 may correspond to the source image sensor output based on the determination that the current zoom level is within a first defined range such that the image that is adjusted is obtained from the source sensor. As shown in the data flow 600, the first image 602, corresponding to the output of the source image sensor in this example, is provided through process 626 to the processor 104 to warp the first image 602 to the second image 612. As another example, in the second set of defined ranges of FIG. 3, the first image 602 may correspond to the target image sensor output based on the determination that the current zoom level is within a second defined range such that the image that is adjusted is obtained from the target sensor. As shown in the data flow 600, the first image 602, corresponding to the output of the target image sensor in this example, is provided through process 626 to the processor 104 to warp the first image 602 to the second image 612.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIG. 1 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
receiving a first request to transition from a first zoom level to a second zoom level;
receiving a second request to change from a first sensor to a second sensor during an image capture from a multi-sensor capture device, wherein the second request is received based on the first request;
determining a current zoom level corresponding to the second request to change from the first sensor to the second sensor; and
generating output image data, after receiving the second request to change from a first sensor to a second sensor, from the multi-sensor capture device by:
adjusting an image from the first sensor based on the current zoom level being determined to be within a first defined range, wherein adjusting the image comprises geometrically warping the image from the first sensor to align with a field of view associated with the second sensor; and adjusting an image from the second sensor based on a subsequent zoom level being determined to be within a second defined range.

2. The method of claim 1, wherein the adjusting the image from the first sensor is based on a blending weight parameter, and wherein the method further comprises changing to the second sensor after the blending weight parameter reaches a threshold value.

3. The method of claim 1, wherein the generating the output image data from the multi-sensor capture device by adjusting the image from the first sensor is performed when a margin on the first sensor at the second zoom level is above a threshold amount.

4. The method of claim 1, wherein the second request to change from the first sensor to the second sensor is based on lighting conditions during the image capture.

5. The method of claim 1, wherein the second request to change from the first sensor to the second sensor is based on detected movement during the image capture.

6. The method of claim 1, wherein the second request to change from the first sensor to the second sensor is based on a user input to track an object during the image capture.

7. The method of claim 1, wherein the method further comprises:
receiving a request to change from the second sensor to a third sensor during the image capture from the multi-sensor capture device;
determining a second current zoom level corresponding to the received request to change from the second sensor to the third sensor;
determining whether the second current zoom level is within a third defined range; and
generating the output image data from the multi-sensor capture device by adjusting an image from one of the second sensor or the third sensor based on whether the second current zoom level is determined to be within the third defined range.

8. The method of claim 1, wherein the first sensor is configured to obtain an image through a first lens with a first optical axis, and wherein the second sensor is configured to obtain an image through a second lens with a second optical axis different from the first optical axis.

9. The method of claim 8, wherein the first lens has a first magnification, and wherein the second lens has a second magnification different from the first magnification.

10. The method of claim 1, wherein the second request to change from a first sensor to a second sensor corresponds to a change during a transition from a first zoom level to a second zoom level.

11. The method of claim 1, wherein the second request is received while the multi- sensor capture device transitions from the current zoom level to the second zoom level.

12. A device, comprising:
a processor; and
a memory coupled to the processor and storing instruction that, when executed by the processor, cause the device to perform operations comprising:
receiving a first request to transition from a first zoom level to a second zoom level;
receiving a second request to change from a first sensor to a second sensor during an image capture from a multi-sensor capture device, wherein the second request is received while the multi-sensor capture device transitions from the current zoom level to the second zoom level based on the first request;
determining a current zoom level corresponding to the received request to change from the first sensor to the second sensor; and
generating output image data, after receiving the request to change from a first sensor to a second sensor, from the multi-sensor capture device by:
adjusting an image from the first sensor based on the current zoom level being determined to be within a first defined range, wherein adjusting the image comprises geometrically warping the image from the first sensor to align with a field of view associated with the second sensor; and
adjusting an image from the second sensor based on a subsequent zoom level being determined to be within a second defined range.

13. The device of claim 12, wherein the adjusting the image from the first sensor is based on a blending weight parameter, and wherein execution of the instructions causes the device to perform operations further comprising changing to the second sensor after the blending weight parameter reaches a threshold value.

14. The device of claim 12, wherein generating the output image data from the multi-sensor capture device by adjusting the image from the first sensor is performed when a margin on the first sensor at the second zoom level is above a threshold amount.

15. The device of claim 12, wherein the second request to change from the first sensor to the second sensor is based on lighting conditions during the image capture.

16. The device of claim 12, wherein the second request to change from the first sensor to the second sensor is based on detected movement during the image capture.

17. The device of claim 12, wherein the second request to change from the first sensor to the second sensor is based on a user input to track an object during the image capture.

18. The device of claim 12, wherein the execution of the instructions causes the device to perform operations further comprising:
receiving a request to change from the second sensor to a third sensor during the image capture from the multi-sensor capture device;
determining a second current zoom level corresponding to the received request to change from the second sensor to the third sensor;
determining whether the second current zoom level is within a third defined range; and
generating output image data from the multi-sensor capture device by adjusting an image from one of the second sensor or the third sensor based on whether the second current zoom level is determined to be within the third defined range.

19. The device of claim 12, wherein the first sensor is configured to obtain an image through a first lens with a first optical axis, and wherein the second sensor is configured to obtain an image through a second lens with a second optical axis different from the first optical axis.

20. The device of claim 19, wherein the first lens has a first magnification, and wherein the second lens has a second magnification different from the first magnification.

21. The device of claim 12, further comprising:
the first image sensor; and
the second image sensor,
wherein the first image sensor has a larger field of view (FOV) than the second image sensor.

22. The device of claim 12, wherein the first image sensor comprises a wide-angle image sensor, and the second image sensor comprises a tele image sensor.

23. The device of claim 12, wherein the second request is received while the multi-sensor capture device transitions from the current zoom level to the second zoom level.

24. A non-transitory computer-readable medium storing instructions that, when executed by a processor of a device, cause the device to perform operations comprising:
receiving a first request to transition from a first zoom level to a second zoom level;
receiving a second request to change from a first sensor to a second sensor during an image capture from a multi-sensor capture device, wherein the second request is received based on the first request;
determining a current zoom level corresponding to the second request to change from the first sensor to the second sensor; and
generating output image data, after receiving the second request to change from a first sensor to a second sensor, from the multi-sensor capture device by:
adjusting an image from the first sensor based on the current zoom level being determined to be within a first defined range, wherein adjusting the image comprises geometrically warping the image from the first sensor to align with a field of view associated with the second sensor; and
adjusting an image from the second sensor based on a subsequent zoom level being determined to be within a second defined range.

25. The non-transitory computer-readable medium of claim 24, wherein the adjusting the image from the first sensor is based on a blending weight parameter, and wherein the operations further comprise changing to the second sensor after the blending weight parameter reaches a threshold value.

26. The non-transitory computer-readable medium of claim 24, wherein the generating the output image data from the multi-sensor capture device by adjusting the image from the first sensor is performed when a margin on the first sensor at the second zoom level is above a threshold amount.

27. The non-transitory computer-readable medium of claim 24, wherein the second request to change from the first sensor to the second sensor is based on lighting conditions during the image capture.

28. The non-transitory computer-readable medium of claim 24, wherein the second request to change from the first sensor to the second sensor is based on detected movement during the image capture.

29. The non-transitory computer-readable medium of claim 24, wherein the second request to change from the first sensor to the second sensor is based on a user input to track an object during the image capture.

30. The non-transitory computer-readable medium of claim 24, wherein execution of the instructions causes the device to perform operations further comprising:
receiving a request to change from the second sensor to a third sensor during the image capture from the multi-sensor capture device;
determining a second current zoom level corresponding to the received request to change from the second sensor to the third sensor;
determining whether the second current zoom level is within a third defined range; and
generating the output image data from the multi-sensor capture device by adjusting an image from one of the second sensor or the third sensor based on whether the second current zoom level is determined to be within the third defined range.

31. The non-transitory computer-readable medium of claim 24, wherein the first sensor is configured to obtain an image through a first lens with a first optical axis, and wherein the second sensor is configured to obtain an image through a second lens with a second optical axis different from the first optical axis.

32. The non-transitory computer-readable medium of claim 31, wherein the first lens has a first magnification, and wherein the second lens has a second magnification different from the first magnification.

33. The non-transitory computer-readable medium of claim 24, wherein the second request is received while the multi-sensor capture device transitions from the current zoom level to the second zoom level.

* * * * *